UNITED STATES PATENT OFFICE.

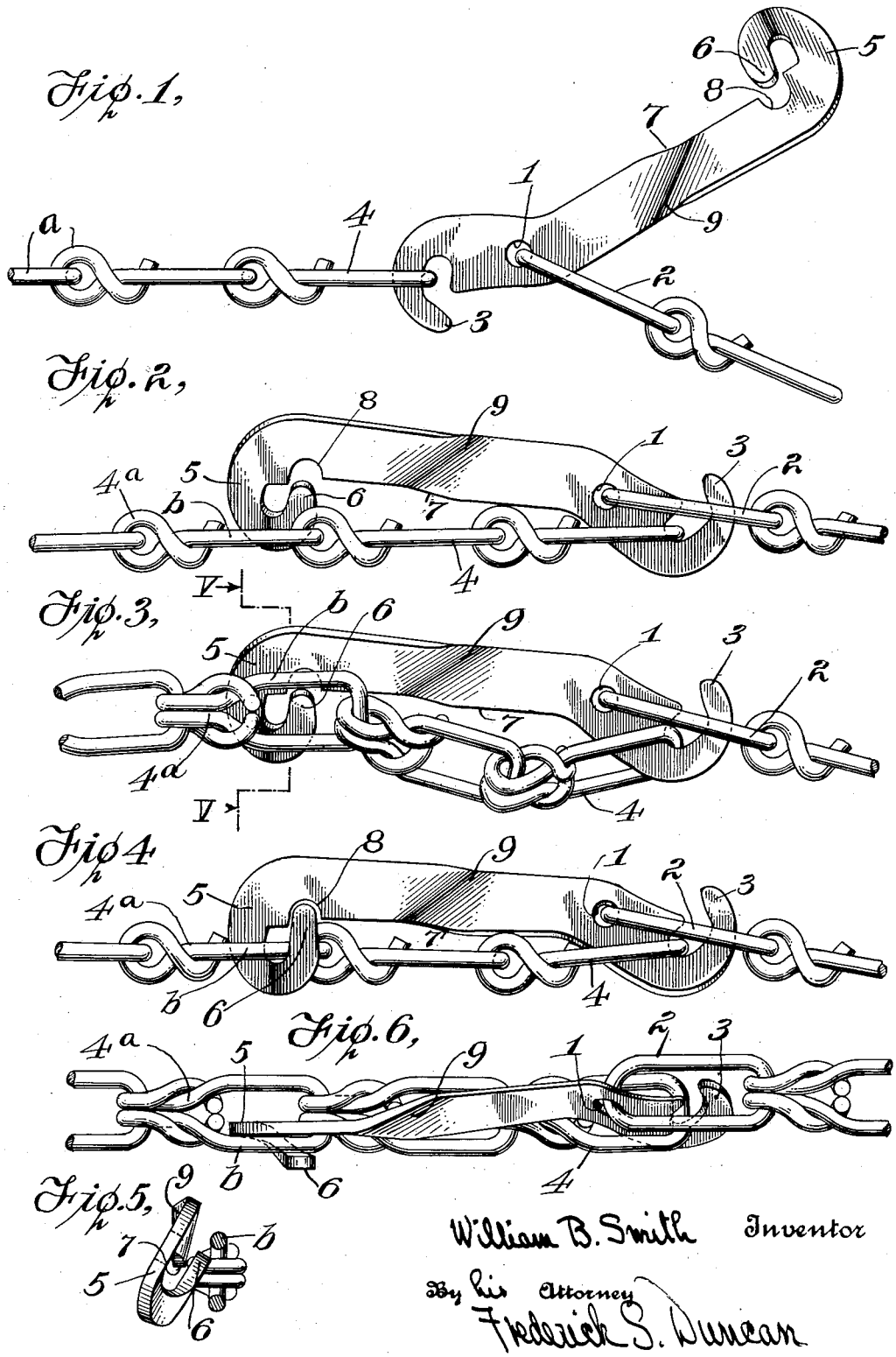

WILLIAM B. SMITH, OF NIAGARA FALLS, NEW YORK, ASSIGNOR TO AMERICAN CHAIN COMPANY, INC., A CORPORATION OF NEW YORK.

CHAIN-TIGHTENING LEVER.

1,395,605.  Specification of Letters Patent.  Patented Nov. 1, 1921.

Application filed January 20, 1919. Serial No. 272,160.

*To all whom it may concern:*

Be it known that I, WILLIAM B. SMITH, United States citizen, temporarily residing in Niagara Falls, New York, have invented the following-described Improvements in Chain-Tightening Levers.

The invention concerns the locking of chain-tightening levers such as used on automobile tire chains, to guard against their accidental loosening when in use, being an improved substitute for those chain levers which are secured to the tightened chain by means of spring latches and other forms of keepers. Such keepers, in practice, become clogged by ice or mud which prevents the unhooking and release of the lever and, being necessarily small in size, they are subject to derangement and are always inconvenient to manipulate. According to this invention such keepers are eliminated and the locking of the tightening lever to the chain is accomplished by utilizing the resistance to torsional displacement, manifested by a tightened chain, as the means for keeping one of its links in an interlocked relation to the hooked end of the lever and thereby preventing unintentional separation. The locked attachment thus produced is easily made and unmade and is amply secure even under the extreme conditions of tire-chain use.

The accompanying drawing illustrates the principle of the invention in connection with the form at present preferred, showing that form in successive positions thus:

Figure 1 indicates the position of the lever as connected to the two ends of the chain to be tightened and at the beginning of the tightening movement.

Fig. 2,—the tightened position of the lever prior to locking it to the chain.

Fig. 3,—the chain as torsionally displaced to receive the lever hook and with the latter in the act of engaging therewith.

Fig. 4,—the same part with the chain released or restored to normal position and holding the lever hook interlocked therewith.

Fig. 5,—a cross view on line V—V also indicating the distorted position of the chain-links and Fig. 6,—a top plan of Fig. 4.

The tightening lever is provided, near one of its ends, with means for connection to the two ends of the chain to be tightened. One of these connections is represented by a hole 1 occupied by the flat terminal link 2 and the other by a hook 3 adapted to be readily attached to one of the links, such as 4, at or near the other end of the chain, and the two connections are so arranged that swinging the lever over to the Fig. 2 position will take up the slack, imparting more or less tension to the chain. The particular form of these connections and their manner of operation to impart tension is obviously subject to variation according to the style of the lever and the chain. The lever is of such length that the hook 5 on its opposite end will substantially register with a link $4^a$, with which it is to engage. The links of wire chains such as used for anti-skid purposes, and in fact of chains of all designs, display a tendency to assume definite axial positions when the chain is under tension. The resistance they oppose to displacement in a rotary sense, or torsionally, is proportional, generally speaking to the tension of the chain and the number and shape of the component links and the said link $4^a$ is near enough to the relatively fixed or non-rotatable link 4 to display sufficient resistance to displacement to produce the desired locking effect even though the tension on the chain is no more than is produced by its own weight, and irrespective of that produced by the tightening which may be considerable. The resistance to torsional displacement is not so great however but that the link $4^a$ may be manually rotated on its own longitudinal axis, from the position of Fig. 2 to about that indicated in Fig. 3 which rotation will bring its side bar marked "$b$" to a position where the tip 6 of the hook 5 may be inserted (upwardly or laterally) into the eye of the link. When the link is then released it will return of its own accord to its initial position, and in so doing will turn or swing farther onto the hook 5 taking the position indicated in Fig. 4, in which position it will be noted the hook cannot be disengaged by any movement of chain or lever except the reverse of that by which they were assembled. The extreme tip, 6, of the hook is carried beyond the general edge-line 7 of the lower side of the lever body so that it overlaps that body and cannot therefore, become freed from the hook by further penetration of the latter into the link, and for additional security the dimensions of the hook, both longitudinally and transversely, are made larger than will permit its passing through the link except when introduced therein tip first as above described. A hook structure having these relational functions may obviously be made of various different shapes and of any material but it is conveniently and most economically formed by stamping it from the flat steel blank from which the lever is formed and in such manner so as to give the hook a laterally offset and helical form as indicated in the drawings. When so made the material of the tip proper can be punched out of the body of the lever as indicated by the presence of the notch 8 thus giving the hook the desired extent of overlap without special bending or shaping. The axis of the curvature of the hook thus formed is transverse to the general plane of the lever.

For some types of chain it is desirable to give the hooked end of the lever a slight twist in one direction or the other with reference to the plane of the connections 1 and 3 in order that the degree of torsional displacement required for locking and unlocking may be no greater or less than necessary. In the case in hand the twist, indicated at 9 is in the direction to meet the side bar "$b$" of the torsionally displaced link 4$^a$ to facilitate introduction of the hook tip, but manifestly the displacement produced by such twist could be otherwise made apparent in the hook proper, in the first instance, according to the method of manufacture, the important feature being a proper angular position of the axis of the hook with reference to the character of the links of the chain.

It will be apparent from a consideration of the principle of the invention that the same may be embodied in a variety of forms all of which are intended to be included in the following claims.

Claims:

1. A chain tightening lever having connections near one end with the ends of the chain to be tightened, one of said connections being detachable, and having near its other end a normally open hook fashioned to engage a torsionally displaced link of the tightened chain and adapted to be locked thereto by the resistance of said link to torsional displacement, the axis of curvature of the hook being transverse to the plane of the lever.

2. A chain tightening lever having connections near one end with the ends of the chain to be tightened, one of said connections being detachable, and having near its other end a normally open hook fashioned to engage a torsionally displaced link of the tightened chain and adapted to be locked thereto by the resistance of said link to torsional displacement, said hook being offset in helical form from the body of the lever.

3. A chain tightening lever having connections near one end with the ends of the chain to be tightened, one of said connections being detachable, and having near its other end a normally open hook fashioned to engage a torsionally displaced link of the tightened chain and adapted to be locked thereto by the resistance of said link to torsional displacement, said hook being offset in helical form from the body of the lever, and the tip of the hook overlapping the chain edge line of the lever body.

4. A chain tightening lever having connections near one end with the ends of the chain to be tightened, one of said connections being detachable, and having near its other end a normally open hook fashioned to engage a torsionally displaced link of the tightened chain and adapted to be locked thereto by the resistance of said link to torsional displacement, and the tip of the hook overlapping the general edge line of the lever body.

5. In means for drawing together and connecting two sections of chain, a lever fulcrumed at a point intermediate its ends by connection with one of said sections and having each end thereof provided with a hook, one of said hooks being in helical form with the axis of curvature thereof transverse to the lever.

6. In means for drawing together and connecting two sections of chain, a lever fulcrumed at a point intermediate its ends by connection with one of said sections and having each end thereof provided with a hook, one of said hooks being in helical form with the axis of curvature thereof transverse to the lever, the tip of said hook overlapping the chain edge line of the lever.

In testimony whereof, I have signed this specification.

WILLIAM B. SMITH.